March 31, 1936.    A. MacLEOD    2,035,902
STRUCTURAL MATERIAL
Filed Nov. 6, 1934    2 Sheets-Sheet 1

INVENTOR
Alexander MacLeod
BY
Durham E. Allen
ATTORNEY

March 31, 1936.        A. MacLEOD        2,035,902
STRUCTURAL MATERIAL
Filed Nov. 6, 1934        2 Sheets-Sheet 2

INVENTOR
Alexander MacLeod
BY
Durham E. Allen
ATTORNEY

Patented Mar. 31, 1936

2,035,902

UNITED STATES PATENT OFFICE 2,035,902

STRUCTURAL MATERIAL

Alexander MacLeod, Bronx, N. Y.

Application November 6, 1934, Serial No. 751,724

9 Claims. (Cl. 72—16)

This invention relates to building materials, more particularly to a wall covering which may be formed in units or slabs and used on floors, walls, roofs and in any place where it is desired to prevent the transfer of heat and sound. The primary object of the invention is to provide a covering material which will be weather resistant and which will also be an effective heat and sound insulator.

Another object of the invention is to provide a building slab or board which may be easily attached to old or new structures by the use of common nails, the heads of which will not show on the completed structure. Another object of the invention is to provide a covering material of convenient thickness and having the necessary strength to be used in building construction.

While many different materials have been used heretofore to cover walls exposed to the weather these materials have not possessed the qualities of being resistant and unaffected by the elements while at the same time having good heat and sound resisting properties. Under the provisions of this invention a covering material has been provided which possesses all of these desirable characteristics while being at the same time simple in construction and convenient in application.

In accordance with the invention a wall covering is provided, each unit of which comprises three main parts or layers i. e. an outer stone-like weather-resistant part, a middle heat-resisting part, and an inner sound and heat insulating part. The outer part comprises a layer of cement having hard, enduring qualities, this layer being attached to a supporting board or strip of pressed, fibrous material. The middle portion includes a plurality of air spaces which provide efficient heat insulation, as well as a layer of metal foil which serves to reflect and prevent the transfer of radiated heat waves. The inner portion is formed of a layer or board of fibrous heat and sound resisting material to the outer side of which may be cemented a layer of heat-reflecting metal foil. Another layer of heat-reflecting metal foil may be cemented by waterproof paint to the side of the fiber supporting board opposite the cement layer in order to further increase the heat resisting properties of the covering.

The supporting board is provided with holes into which part of the stone-like cement is squeezed while in a still plastic state and the cement and board are thus bound together inseparably. The outer, middle and inner parts are preferably attached together by means of an adhesive and a plurality of metal eyelets through which nails may be driven to secure the slabs to the building studs.

Instead of attaching the cement layer to a pressed board, the cement may be pressed onto a suitable metal lath formed of a polished metal foil supported on a wire framework, the lath thus being embedded in the cement to form a heat reflecting support for the cement layer.

In some installations it may not be necessary to use all three parts of the covering and it is contemplated that the outer part may be used alone when the occasion demands. In these cases the slabs formed of a layer of cement attached to either the fiber supporting board or to the metal lath may be secured to the building studs in substantially the same manner as the slabs composed of the three parts mentioned hereinbefore.

For a further description of the invention reference may be had to the accompanying drawings in which Fig. 1 is a face view, substantially full size, of a portion of a building slab embodying the invention and showing the cement layer;

Fig. 4A is a cross sectional elevation of a portion of an outer layer of cement attached to metal lath as shown in Fig. 4, while

Figure 2:
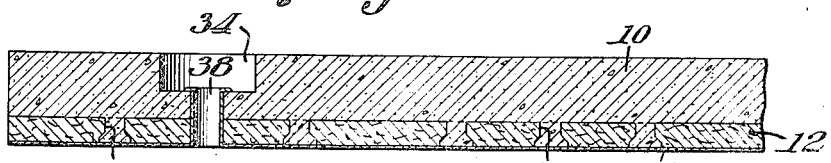
Fig. 2 is a sectional elevation of the outer part of the unit taken on line 2—2 of Fig. 1.

Referring to the drawings, Figure 2 shows a cross section of the outer part of the building slab, this part comprising a weather resistant layer 10 of cement attached to a board 12 which is preferably of pressed wood or fiber. In making this part of the slab a piece of fiber or pressed wood of the desired size such as 24 x 48 inches and from ⅛ to ¼ inch in thickness has punched therein a plurality of holes 14, in any desired configuration, the holes being preferably from 1 to 2 inches apart. The board is then covered by a waterproofing paint and allowed to dry. The cement 10 is then poured into a suitable mold and while the cement is still in the plastic state the waterproofed board 12 is placed on top of the mixture and pressed downwardly until the cement passes into and through the holes 14. The mold is preferably placed under a press and the board forced against the cement to insure the filling of the holes 14. The holes 14 are preferably tapered outwardly as shown in Figure 2 so that when the cement is dry it will not pull away from the board 12. In this manner a unit having a stone-like cement surface of great strength and hardness is obtained.

Figure 1:
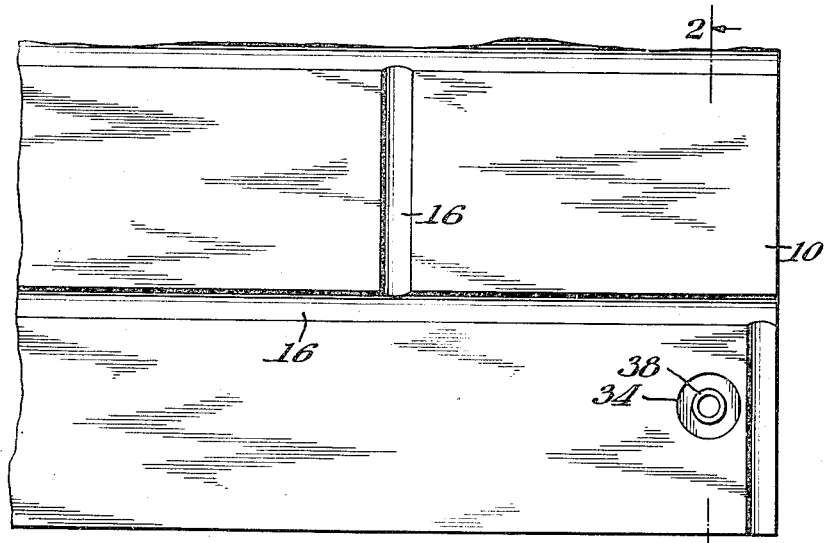

The face of the cement may be molded into any desired shapes such, for instance, as the brick work or tiling shown in Fig. 1, the ornamental grooves 16 being moulded into the face of the cement at the same time that the fiber board is being secured to the rear of the cement. The cement may be colored or mottled to resemble brick work, marble or tile and the effect is very pleasing.

The layer of cement 10 forms a very hard and durable coating and is highly resistant to the elements. The fiber board 12 while serving mainly as a support for the cement also acts to retard heat transfer. A layer of brightly polished metal foil 18 may be cemented to the outer side of the fiber board 12 by waterproof paint or any other suitable adhesive. The metal foil acts as an efficient radiant heat reflecting medium and aids in preventing the transfer of heat into and through the fiber board 12.

Figure 3:
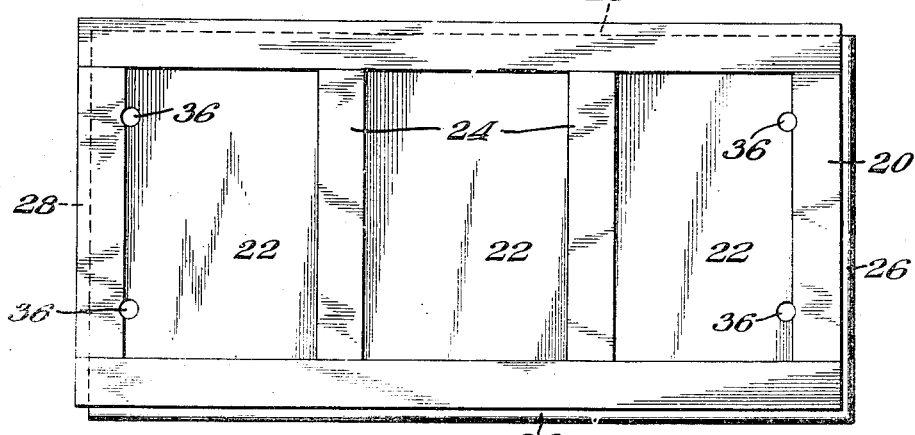
Fig. 3 is a face view of the middle part of the slab.

The middle part of the building slab is formed of a pair of similar frames or gaskets 20 of fibrous material between which is supported a layer of brightly polished metal foil 22. The frame is of a size to correspond with the building slab and as shown in Figure 3 a pair of reinforcing cross strips 24 are provided on each half of the frame to hold the metal foil 22 securely in position. These cross strips 24 are preferably positioned so that they will line up with the studs of the building on which they are to be used and as shown in Figure 3 these strips are spaced apart about 16 inches. The fiber frames 20 may be of any convenient thickness but it is suggested that each half be about ¼ inch from front to back. A plurality of closed air spaces are thus formed, these spaces serving as efficient heat insulation. The frames 20 are preferably provided along two sides with projecting edges 26 and the opposite sides of the frame with grooves 28. As will be observed with reference to Figure 5, when the frames 20 and the metal foil 22 are in position the edges 26 form a tongue which may engage the groove 28 in the adjacent slab to prevent the passage of moisture through the covering. If desired a thin coating of cement may be used between the edges of adjacent slabs.

The third or inner layer of the slab is formed of a sheet 30 also of fibrous material and of substantially the same size and thickness as the outer portion shown in Figures 1 and 2. A layer of polished metal foil 32 may be cemented to the exposed surface of the fibrous layer 30 to aid in reflecting radiated heat. If desired the edges of the sheet 30 may be provided with tongues and grooves (not shown) to coact in a manner similar to the tongues 26 and grooves 28 shown in Fig. 3.

Figure 5:
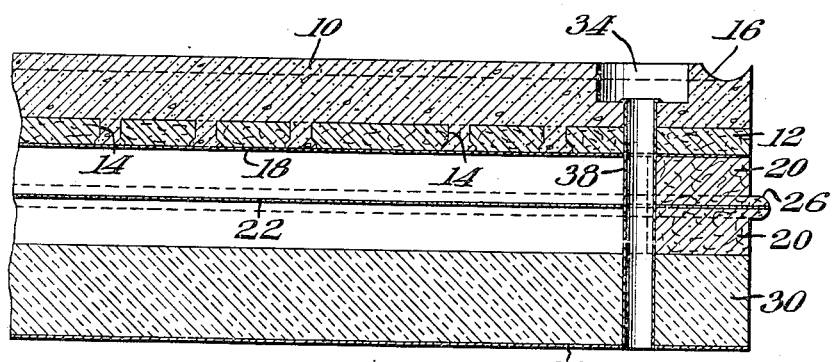
Fig. 5 is a sectional elevation of a complete slab showing the outer, middle and inner portions.

After the three parts of the slab are constructed they are preferably cemented together as shown in Figure 5 by means of a suitable adhesive such as waterproof paint.

In order to secure the slabs to the studs or frame of a building the cement layer 10 has moulded therein a plurality of countersunk openings, one of which is shown at 34 in Figure 1. Openings 36 are also provided in the frames 20 and the inner fibrous layer 30, these openings being in alignment with the openings 34 in the cement. A plurality of metal eyelets 38 are placed in the openings 34 and 36 and serve to hold the three parts of the slab together. Suitable nails may be driven through the eyelets 38 and into the studs of the building to be covered and the countersunk openings 34 in the cement are then preferably sealed with cement of the same type as that used in the layer 10. By this method of attaching the slabs to the building the nail heads will be not only protected from the weather but also covered in a manner such that they will not be seen.

Figure 4:
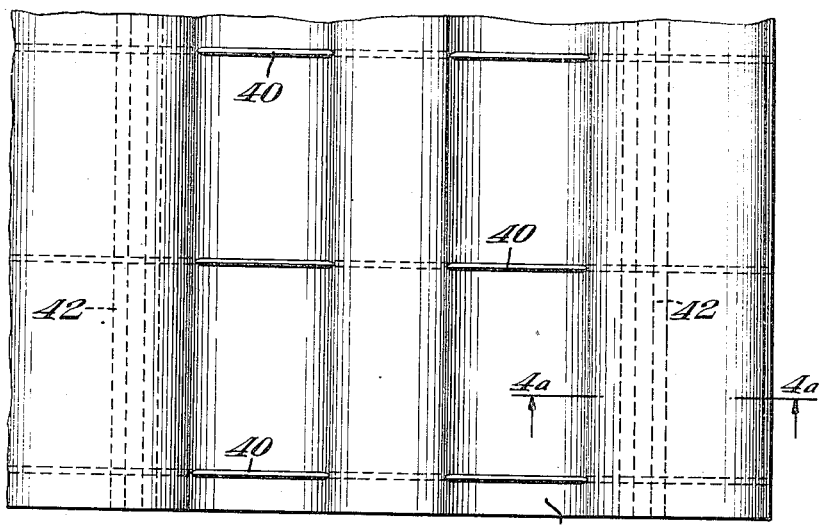
Fig. 4 is a bottom or inner face view of a modified form of the outer portion showing the metal lath used in place of the fiber board.
Figure 4A:
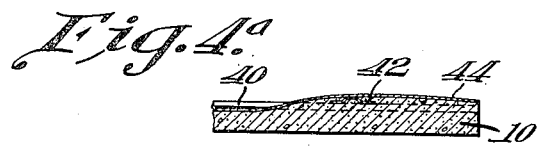

In place of the fiber supporting board 12 shown in Figures 2 and 5 a metal lath may be used as a base or support for the cement. As will be observed with reference to Figures 4 and 4A the metal lath comprises a plurality of wires 40 attached as by welding to metallic strips 42. The frame formed by the wires 40 and the strips 42 supports a layer of metal foil 44 which may be woven on the frame as is shown in Figure 4. In using the metal lath, the lath and the cement are pressed together in a suitable mold, the cement adapting itself to the configuration of the lath as shown in Figure 4A. With this construction the metal lath serves not only as a support for the cement 10 but also as a radiant heat reflecting medium due to the bright surface of the foil 44. The slab as shown in Figures 4 and 4A may be attached directly to the studs of a building or it may be used in place of the layers 10, 12 and 18 in the embodiment shown in Figure 5.

While the building slabs have been described as applicable as a covering for the walls of a building, it is to be understood that they may be used for other purposes such as in roofing and floor construction in substantially the same manner.

As has been mentioned hereinbefore, it is preferred that the construction as shown in Figure 5 be used since with this arrangement the passage of heat and sound through the slabs is almost impossible. The layers of fibrous materials 12, 20 and 30 prevent heat transfer by conduction as well as affording an efficient sound deadening medium. The air spaces formed by the fibrous frames 20 also afford a heat insulation of the highest order. The layers of metal foil 18, 22 and 32 serve to reflect radiant heat which might tend to pass through the slab. It is to be understood that either of the layers of metal foil 18, and 32 or both of these layers may be omitted from the building slab without departing from the invention.

Obviously many modifications and variations of the invention, as hereinbefore set forth, may be made without departing from the spirit and scope thereof, and therefore only such limitations should be imposed as are indicated in the appended claims.

I claim:—

1. A structural wall building slab comprising an outer stone-like weather resistant portion of cement and a heat resistant fibrous board inseparably connected to said stone-like portion, a middle portion comprising a pair of fibrous frames between which is secured a heat reflecting layer of metal foil, and an inner portion comprising a layer of heat and sound resistant fibrous material.

2. A structure as defined in claim 1 in which said outer portion, said middle portion and said inner portion are secured together by means of a plurality of metal eyelets so as to form a unitary slab.

3. A structure as defined in claim 1 in which said fibrous frames are provided along their edges with oppositely disposed tongues and grooves arranged so that the tongues and grooves of adjacent units may interengage so as to present a substantially unbroken wall.

4. A composite structural unit comprising an outer layer of stone-like cement adapted to withstand extreme weather conditions, and an inner layer of heat resistant metal lath, said lath consisting of a wire supporting frame and a layer of metal foil, the wire of said frame being woven through said foil, said cement layer and said metal lath being pressed together while said cement is in a plastic condition, to form a unitary slab.

5. A structural unit comprising an outer weather-resistant portion of cement and a metal lath formed of a layer of heat reflecting metal foil and a wire frame, the wire of said frame being woven through said foil, said metal lath being inseparably connected to said cement portion, a middle portion comprising a pair of fibrous frames between which is secured a second heat reflecting layer of metal foil, and an inner portion comprising a layer of heat and sound resistant fibrous material.

6. A building wall slab comprising an outer layer of weather-resistant material, a middle portion comprising a pair of aligned, grid-like fibrous frames between which is secured a sheet of heat reflecting metal foil, and an inner layer of heat and sound resistant fibrous material, said outer layer being disposed against the side of one of said frames and said inner layer being disposed against the opposite side of the other of said frames, a plurality of dead air spaces thus being formed on both sides of said metal foil and between said foil and said outer and inner layers.

7. A structural unit comprising an outer layer of cement and an inner layer of metal lath, said lath comprising a wire frame and a layer of metal foil, the wire of said frame being woven through said foil and part of said wire frame being embedded in said cement so as to secure said metal foil to said cement layer.

8. A building wall slab comprising a pair of aligned grid-like frames of fibrous material between which is secured a layer of metal foil, a layer of weather resistant material secured to one side of one of said frames and a layer of heat and sound resistant material secured to the opposite side of the other of said frames, the cut out portions of said frames thus providing dead air spaces on both sides of said metal foil layer.

9. A building wall slab comprising a pair of grid-like frames between which is secured a layer of metal foil, each of said frames comprising elongated longitudinal and transverse fibrous members having openings therebetween, a layer of weather resistant material secured to one side of one of said frames and a layer of heat and sound resistant material secured to the opposite side to the other of said frames, the openings in said frames thus providing dead air spaces on both sides of said metal foil layer.

ALEXANDER MacLEOD.